(12) United States Patent
Wagner et al.

(10) Patent No.: US 9,323,549 B2
(45) Date of Patent: *Apr. 26, 2016

(54) SYSTEMS AND METHODS FOR TRIGGERING SCRIPTS BASED UPON AN ALERT WITHIN A VIRTUAL INFRASTRUCTURE

(71) Applicant: Tripwire, Inc., Portland, OR (US)

(72) Inventors: Andrew Wagner, Portland, OR (US); Brian McFeely, Portland, OR (US); Robert DiFalco, Portland, OR (US)

(73) Assignee: Tripwire, Inc., Portland, OR (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/059,189

(22) Filed: Oct. 21, 2013

(65) Prior Publication Data

US 2014/0082620 A1    Mar. 20, 2014

Related U.S. Application Data

(63) Continuation of application No. 12/701,492, filed on Feb. 5, 2010, now Pat. No. 8,566,823.

(51) Int. Cl.
*G06F 9/455* (2006.01)
*G06F 11/30* (2006.01)

(52) U.S. Cl.
CPC ............ *G06F 9/455* (2013.01); *G06F 9/45558* (2013.01); *G06F 11/301* (2013.01); *G06F 11/3006* (2013.01); *G06F 11/3065* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 5,493,729 A | 2/1996 | Nigawara et al. | |
| 5,828,830 A | 10/1998 | Rangaraian et al. | |
| 6,006,016 A | 12/1999 | Faigon et al. | |
| 6,112,225 A | 8/2000 | Kraft et al. | |
| 6,182,119 B1 | 1/2001 | Chu | |
| 6,182,249 B1 | 1/2001 | Wookey et al. | |
| 6,279,043 B1 * | 8/2001 | Hayward | G06F 9/54 719/328 |
| 6,282,175 B1 | 8/2001 | Steele et al. | |
| 6,629,106 B1 | 9/2003 | Narayanaswamy et al. | |
| 6,938,081 B1 | 8/2005 | Mir | |
| 6,941,557 B1 | 9/2005 | Jakobson et al. | |
| 7,028,228 B1 | 4/2006 | Lovy et al. | |
| 7,127,446 B1 * | 10/2006 | Menezes | G06F 8/30 |
| 7,243,348 B2 | 7/2007 | Good et al. | |
| 7,287,193 B2 | 10/2007 | Ward | |
| 7,316,016 B2 | 1/2008 | DiFalco | |
| 7,337,090 B1 | 2/2008 | Yemini et al. | |
| 7,360,099 B2 | 4/2008 | DiFalco et al. | |
| 7,469,287 B1 | 12/2008 | Castillo et al. | |
| 7,490,322 B2 | 2/2009 | Pichetti et al. | |
| 7,581,212 B2 * | 8/2009 | West et al. | 717/136 |
| 7,587,754 B2 | 9/2009 | DiFalco et al. | |

(Continued)

OTHER PUBLICATIONS

Non-final Office Action dated Jul. 18, 2011, in U.S. Appl. No. 12/701,491, 15 pages.

(Continued)

*Primary Examiner* — Adam Lee
(74) *Attorney, Agent, or Firm* — Klarquist Sparkman, LLP (57) ABSTRACT

Embodiments of the present disclosure provide methods and systems for triggering scripts based upon an alert within a virtual infrastructure. Other embodiments may be described and claimed.

19 Claims, 5 Drawing Sheets

(56) References Cited

U.S. PATENT DOCUMENTS

| | | |
|---|---|---|
| 7,620,715 B2 | 11/2009 | DiFalco et al. |
| 7,711,703 B2 | 5/2010 | Smolen et al. |
| 7,711,980 B1 | 5/2010 | Scarpello, Jr. et al. |
| 7,765,460 B2 | 7/2010 | DiFalco et al. |
| 7,822,724 B2 | 10/2010 | DiFalco et al. |
| 7,860,222 B1 | 12/2010 | Sidler et al. |
| 8,031,634 B1 | 10/2011 | Artzi et al. |
| 8,140,635 B2 | 3/2012 | DiFalco |
| 8,140,919 B2 | 3/2012 | Glaser et al. |
| 8,176,158 B2 | 5/2012 | DiFalco et al. |
| 8,356,309 B1* | 1/2013 | Burrell .................... H04L 29/08 719/321 |
| 8,364,639 B1 | 1/2013 | Koryakina et al. |
| 2002/0078382 A1 | 6/2002 | Sheikh et al. |
| 2002/0112078 A1 | 8/2002 | Yach |
| 2003/0037089 A1 | 2/2003 | Cota-Robles et al. |
| 2004/0024843 A1 | 2/2004 | Smith |
| 2004/0122962 A1 | 6/2004 | DiFalco et al. |
| 2004/0128670 A1 | 7/2004 | Robinson et al. |
| 2004/0237069 A1* | 11/2004 | Colgrave .................. G06F 8/30 717/115 |
| 2005/0050068 A1 | 3/2005 | Vaschillo et al. |
| 2005/0137832 A1 | 6/2005 | Yemini et al. |
| 2005/0223356 A1* | 10/2005 | Kanchi ............... G06F 9/45512 717/115 |
| 2005/0257206 A1* | 11/2005 | Semerdzhiev ............. G06F 8/65 717/168 |
| 2006/0010176 A1* | 1/2006 | Armington ........... G06F 9/4856 |
| 2006/0041659 A1 | 2/2006 | Hasan et al. |
| 2006/0136914 A1* | 6/2006 | Marascio ............ G06F 11/3664 718/100 |
| 2006/0161879 A1 | 7/2006 | Lubrecht et al. |
| 2006/0242277 A1 | 10/2006 | Torrence et al. |
| 2006/0262915 A1 | 11/2006 | Marascio et al. |
| 2007/0028237 A1 | 2/2007 | Bulson et al. |
| 2007/0043786 A1 | 2/2007 | DiFalco et al. |
| 2007/0043860 A1 | 2/2007 | Pabari |
| 2007/0124255 A1 | 5/2007 | DiFalco et al. |
| 2007/0130566 A1 | 6/2007 | van Rietschote et al. |
| 2007/0174449 A1 | 7/2007 | Gupta |
| 2007/0271552 A1* | 11/2007 | Pulley ....................... G06F 8/60 717/120 |
| 2007/0283348 A1 | 12/2007 | White |
| 2007/0299882 A1 | 12/2007 | Padgett et al. |
| 2007/0300218 A1 | 12/2007 | Mann |
| 2008/0059474 A1* | 3/2008 | Lim .................... G06F 17/3089 |
| 2008/0114581 A1 | 5/2008 | Meir et al. |
| 2008/0114873 A1* | 5/2008 | Chakravarty ....... G06F 11/3065 709/224 |
| 2008/0114874 A1 | 5/2008 | Meir et al. |
| 2008/0134050 A1 | 6/2008 | Franceschelli et al. |
| 2008/0134175 A1* | 6/2008 | Fitzgerald et al. ................ 718/1 |
| 2008/0163207 A1 | 7/2008 | Reumann et al. |
| 2008/0163211 A1 | 7/2008 | Mizuno |
| 2008/0178249 A1 | 7/2008 | Gordon et al. |
| 2008/0222375 A1 | 9/2008 | Kotsovinos et al. |
| 2008/0270984 A1* | 10/2008 | Tsutsumitake ............... 717/115 |
| 2009/0007058 A1* | 1/2009 | Dharmagadda ............... 717/104 |
| 2009/0037492 A1 | 2/2009 | Baitalmal et al. |
| 2009/0037905 A1* | 2/2009 | Hamilton et al. .................. 718/1 |
| 2009/0094336 A1 | 4/2009 | Echevarria et al. |
| 2009/0094584 A1 | 4/2009 | Dheap et al. |
| 2009/0138541 A1 | 5/2009 | Wing et al. |
| 2009/0177710 A1 | 7/2009 | Holenstein et al. |
| 2009/0199177 A1 | 8/2009 | Edwards et al. |
| 2009/0287818 A1 | 11/2009 | Tachibana et al. |
| 2009/0292948 A1 | 11/2009 | Cinato et al. |
| 2009/0300578 A1 | 12/2009 | Neil |
| 2010/0005107 A1 | 1/2010 | DiFalco |
| 2010/0017519 A1 | 1/2010 | Han et al. |
| 2010/0023612 A1 | 1/2010 | Yoshida et al. |
| 2010/0049929 A1 | 2/2010 | Nagarkar |
| 2010/0093319 A1* | 4/2010 | Sherman ........... H04M 3/42178 455/414.1 |
| 2010/0100955 A1 | 4/2010 | Young et al. |
| 2010/0162229 A1* | 6/2010 | Tsuk ................... G06F 9/44526 717/175 |
| 2010/0175063 A1 | 7/2010 | Ciano et al. |
| 2010/0191887 A1 | 7/2010 | Serebrin |
| 2010/0242045 A1 | 9/2010 | Swamy et al. |
| 2010/0275199 A1 | 10/2010 | Smith et al. |
| 2011/0004914 A1 | 1/2011 | Ennis, Jr. et al. |
| 2011/0032260 A1 | 2/2011 | Duggan et al. |
| 2011/0055385 A1 | 3/2011 | Tung et al. |
| 2011/0119670 A1 | 5/2011 | Sugumar et al. |
| 2011/0137905 A1 | 6/2011 | Good et al. |
| 2011/0138038 A1 | 6/2011 | Good et al. |
| 2011/0138039 A1 | 6/2011 | Good et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2012/0023076 A1 | 1/2012 | Torrence et al. |
| 2012/0137293 A1 | 5/2012 | Bozek et al. |
| 2012/0179805 A1 | 7/2012 | DiFalco |

OTHER PUBLICATIONS

Final Office Action dated Nov. 25, 2011, in U.S. Appl. No. 12/701,491, 18 pages.

Non-final Office Action dated May 10, 2012, in U.S. Appl. No. 12/701,493, 14 pages.

Non-final Office Action dated Jul. 19, 2012, in U.S. Appl. No. 12/701,492, 17 pages.

Non-final Office Action dated Oct. 2, 2012, in U.S. Appl. No. 12/701,491, 17 pages.

Non-final Office Action dated Dec. 17, 2012, in U.S. Appl. No. 12/701,493, 22 pages.

Final Office Action dated Jan. 11, 2013, in U.S. Appl. No. 12/701,492, 13 pages.

Final Office Action dated May 30, 2013, for U.S. Appl. No. 12/701,491 (published as US 2011/0197094), 16 pages.

Final Office Action dated Aug. 6, 2013, in U.S. Appl. No. 12/701,493, 21 pages.

Notice of Allowance dated Aug. 20, 2013, in U.S. Appl. No. 12/701,492, 20 pages.

Non-Final Office Action dated Jan. 9, 2014, in U.S. Appl. No. 12/701,491, 17 pp.

Non-final Office Action dated Mar. 7, 2014, in U.S. Appl. No. 12/701,493, 36 pages.

* cited by examiner

SYSTEMS AND METHODS FOR TRIGGERING SCRIPTS BASED UPON AN ALERT WITHIN A VIRTUAL INFRASTRUCTURE

CROSS REFERENCE TO RELATED APPLICATIONS

This application is a continuation of U.S. patent application Ser. No. 12/701,492, filed Feb. 5, 2010, which is hereby incorporated by reference.

TECHNICAL FIELD

Embodiments of the present disclosure relate to the field of data processing, and more particularly, to detecting and correlating log events, configuration changes and conditions producing alerts within a virtual infrastructure.

BACKGROUND

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring a special conditioned environment to operate. At the same time, special purpose computing devices such as personal digital assistants, media players, wireless mobile phones are common. Further, advances in networking, telecommunication, satellite, and other related technologies have also led to increase in connectivity between computing devices, making possible networked computing over private and/or public networks, such as the Internet.

However, as networked computing continues to grow in sophistication, enterprise networks become increasingly complex. Many networks are now partitioned to include one or more virtual infrastructures. VMware® software, available from VMware®, Inc., may be used to provide the one or more virtual infrastructures and provides a completely virtualized set of hardware to a guest operating system. VMware® software virtualizes the hardware for a video adapter, a network adapter, and hard disk adapters. The host provides pass-through drivers for guest USB, serial, and parallel devices. In this way, VMware® virtual machines become highly portable between computers, because the guests have no knowledge of the host on which they are running. In practice, a system administrator can pause operations on a virtual machine guest, move or copy that guest to another physical computer, and there resume execution exactly at the point of suspension. Alternately, for enterprise servers, a feature called VMotion allows the migration of operational guest virtual machines between similar but separate hardware hosts sharing the same storage. Each of these transitions is completely transparent to any users on the virtual machine at the time it is being migrated.

From configuration, application service provision, change management, to network protection, enterprises currently face many challenges.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

For the purposes of the present disclosure, the phrase "A/B" means A or B. For the purposes of the present disclosure, the phrase "A and/or B" means "(A), (B), or (A and B)". For the purposes of the present disclosure, the phrase "at least one of A, B, and C" means "(A), (B), (C), (A and B), (A and C), (B and C), or (A, B and C)". For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As is known in the art, many network computing systems are configured using virtualization technology. Thus, many processing devices and/or processing systems may be virtually configured such that they operate as multiple independent systems. Generally, the systems are arranged to include at least one virtual machine, as well as one or more virtual objects that may function or operate in a manner similar to a physical peripheral device, for example, a CD Rom, a floppy disk drive, etc. The virtual machines generally function as the processor and/or controller within the virtual system. Each virtual system may include one or more virtual machines that may operate independently of each other and/or some of the virtual machines may run interdependently.

Figure 1A:
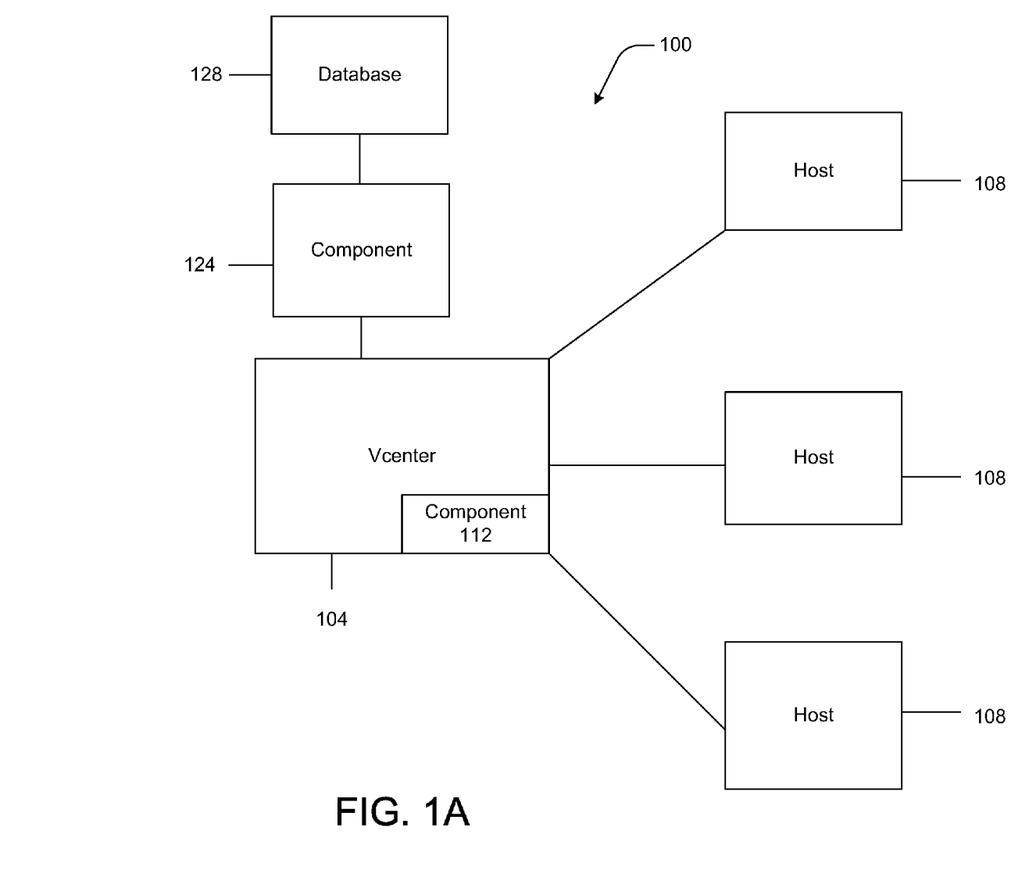
FIG. 1A schematically illustrates a network configured with a virtual infrastructure.

FIG. 1A schematically illustrates a network 100 that includes a virtual center (vCenter) 104 and a plurality of hosts

108. The vCenter 104 includes a component 112 that provides intra-partitioning of the hosts 108 into one or more virtual infrastructures. The vCenter is a VMware® server that is used to control one or more hosts 108. The component 112 may be in the form of software or firmware. In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present disclosure. Machine accessible medium may be firmware, e.g., an electrically erasable programmable read-only memory (EE-PROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the disclosure.

Figure 1B:
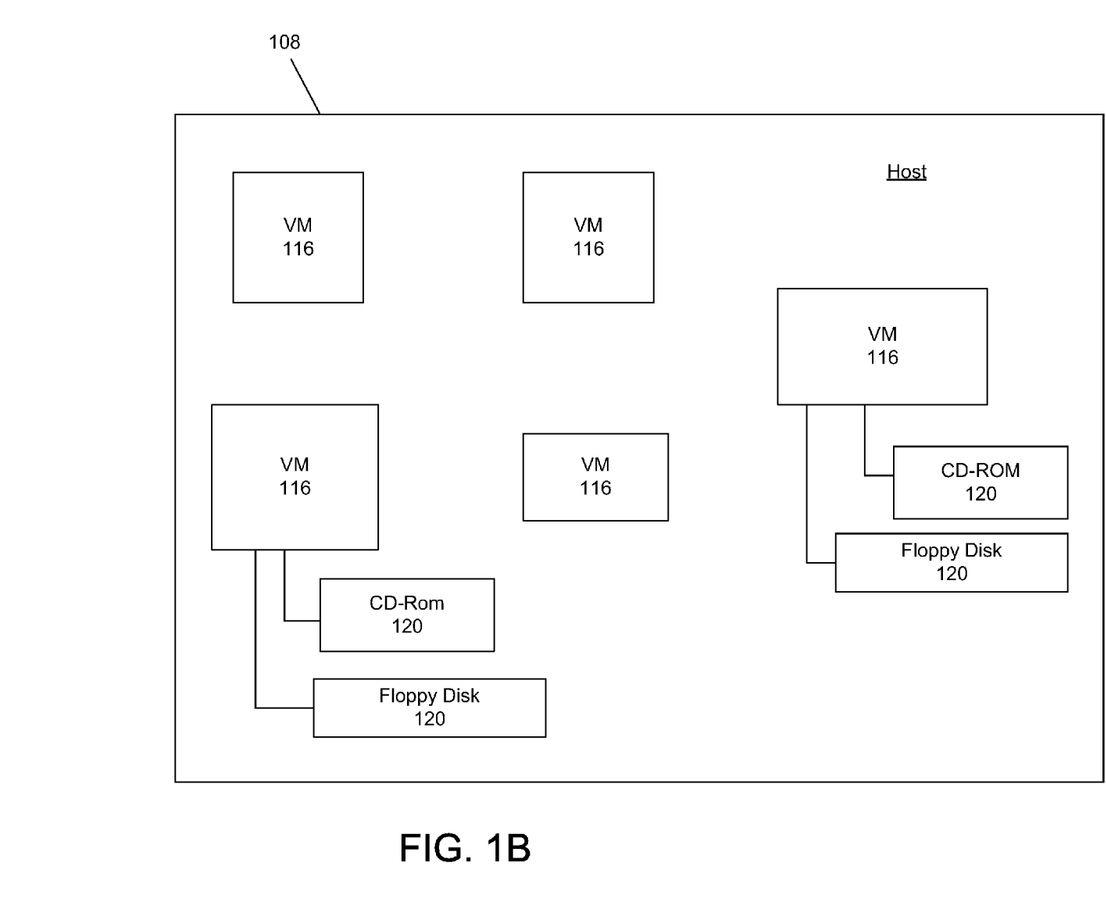
FIG. 1B schematically illustrates a host, configured with a virtual infrastructure, from the network of FIG. 1A.

With reference to FIG. 1B, a host 108 may be configured by the component 112 of FIG. 1A to include one or more virtual machines 116. Virtual objects 120 may also be configured and linked to one or more corresponding virtual machine(s) 116. As previously noted, each virtual machine 116, and any associated virtual objects 120, may operate independently, or may operate interdependently. Virtual objects 120 may also be associated with more than one VM 116. As examples of virtual objects, CD-ROMs and Floppy Disks are illustrated in FIG. 1B.

Figure 2:
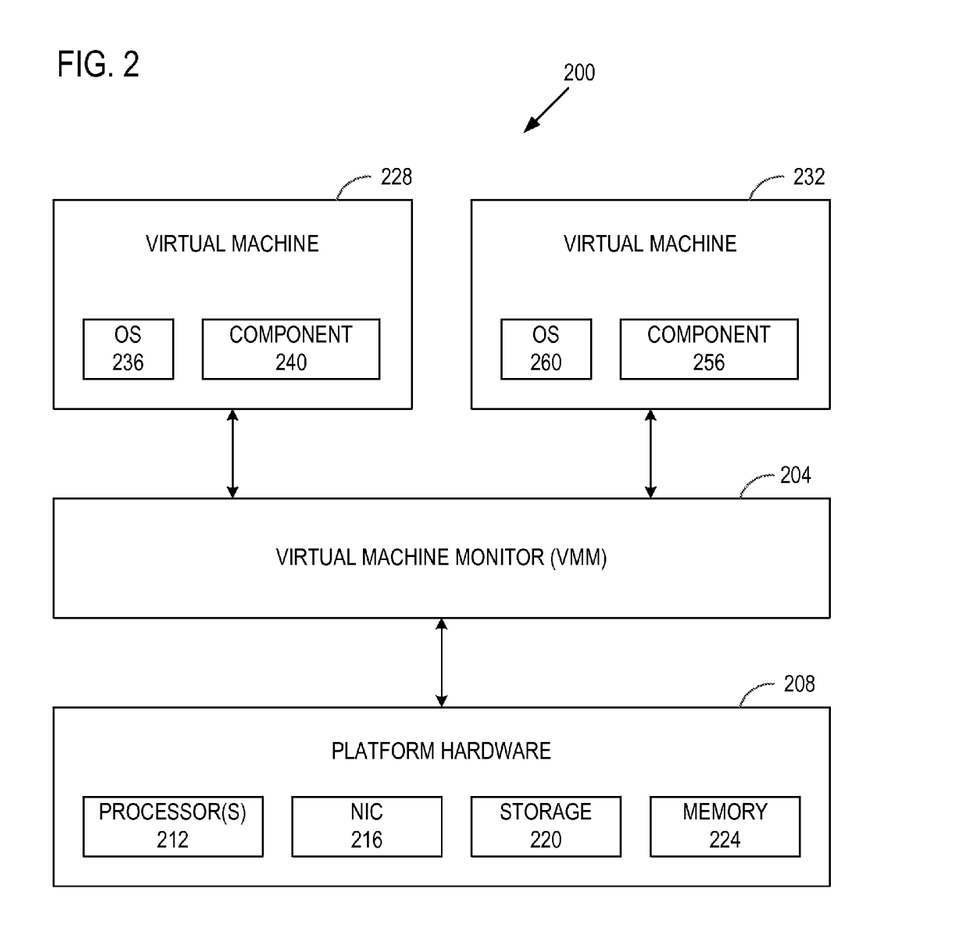
FIG. 2 schematically illustrates a platform utilizing parallel execution environments for the host of FIG. 1B.

More particularly, FIG. 2 illustrates a platform 200 wherein virtualization via, for example, VMware®, is utilized to provide parallel execution environments within the hosts 108. FIG. 2 illustrates one example for one host. In this exemplary embodiment, a management module, e.g., virtual machine monitor (VMM) 204, on the platform 200 may present multiple abstractions and/or views of the platform hardware 208, e.g., one or more processor(s) 212, network interface controller 216, storage 220, and/or memory 224, to the one or more independently operating execution environments, or "virtual machines (VMs)," e.g., first VM 228 and second VM 232. The first VM 228 may include an OS 236 and component 240, while the second VM 232 may include an OS 260 and component 256. The first VM 232 may be configured to execute code independently and securely isolated from the second VM 228 and may prevent components of the first VM 228 from performing operations that would alter, modify, read, or otherwise affect the components of the second VM 232. As previously discussed, the first VM 232 may be configured to execute code interdependently with the second VM 228 and may allow components of the first VM 228 to perform operations that would alter, modify, read, or otherwise affect the components of the second VM 232. While the platform 200 shows two VMs, other embodiments may employ any number of VMs.

The components operating in the first VM 228 and second VM 232 may each operate as if they were running on a dedicated computer rather than a virtual machine. That is, components 240 and 256 operating in the first VM 228 and second VM 232, respectively, may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

Thus, FIG. 1A illustrates a network 100 configured with a virtual infrastructure made up of at least one vCenter 104 and one or more hosts 108 that are configured to include virtual infrastructures made up of one or more virtual machines 116 and one or more virtual objects 120 as illustrated in FIG. 1B.

As with any type of network, it is important to maintain the integrity of the network and its associated systems. Furthermore, various events may occur that can lead to problems within the network. Thus, it is important to monitor and manage the virtual infrastructure in order to detect events that occur that can affect the integrity and/or cause problems for the virtual infrastructure. Event occurrences include, for example, users logging into the virtual infrastructure, VMs 116 migrating from one host 108 to another host 108, VMs 116 starting up or shutting down, users modifying configurations of virtual objects or machines, etc. Another type of event that may occur includes a configuration change, wherein one or more aspects related to a configuration for the virtual infrastructure has been changed. Examples include modifications to resource allocations within a resource pool, changes to the virtualized hardware assigned to a VM, changes to the security policy of a virtual network, etc. Some event occurrences and configuration changes may cause alerts. In other instances, conditions, such as, for example the detection of snapshots that are older than a certain threshold, the detection of datastores with less than a certain threshold of free space, the detected failure of a Logical Unit Number (LUN) path, the detection of a failed vMotion, the detection of a newly created or deleted VM 116, etc, within the virtual infrastructure may also cause an alert. Another type of event includes a relationship change, which includes, for example, detection of a newly added object (CD-ROM 120) to a VM 116, a movement of a VM 116 from one host 108 to another host 108, the assignment of a host 108 to a cluster of hosts 108, etc. An alert may include some type of message to alert the system administrator as to the occurrence of the event, the configuration change and/or the conditions within the virtual infrastructure. Thus, as used herein, events generally refer to and include event occurrences, configuration changes and conditions that may cause an alert.

Accordingly, in accordance with various embodiments of the present invention, the network 100 includes a component 124 that is configured to monitor the virtual infrastructure by communicating with the vCenter 104 in order to detect events. Generally, the component 112 is configured maintain a system log (syslog) keeping record of various events that are detected. The component 124 may be located at a server that provides the vCenter 104 or may be located remotely at a different server.

In response to detection of an event within the virtual infrastructure, the component 124 is configured to generate an alert for a virtual machine 116 and/or virtual object 120 due to an event within the virtual infrastructure. The alert is generally displayed to a user or system administrator of the virtual infrastructure. The user may then select a script for execution with respect to the affected virtual machine 116 and/or virtual object 120 that was the subject of the alert. The affected virtual machine 116 and/or virtual object 120 is represented and/or organized into a format against which the script may be executed. An example of such a scripting format is PowerShell® from Microsoft, Inc. The affected virtual machine and/or virtual object 120 is "converted" from its internal representation within network 100 into a "scripting" representation based upon the scripting format. Once the script has been executed against the affected virtual machine 116 and/or virtual object 120 in order to, for example, remediate the event that caused the alert, the scripting representation is no longer needed and is thus, not used further. The script may be executed for other reasons than to remediate the event that caused the alert. The script may be executed, for example, gathering more information around the event or taking some kind of action to prevent further risk (e.g., removing a VM from the network if it doesn't meet some configuration standards, etc.)

In accordance with various embodiments, multiple virtual machines 116 and/or virtual objects 120 may be affected by the event that caused the alert. Thus, all of the affected virtual machines 116 and/or virtual objects 120 may have the script executed against them. Thus, all of the affected virtual machines 116 and/or virtual objects 120 would be represented by the scripting format and have the script executed in order to remediate the event.

In accordance with various embodiments of the present invention, scripts for use in remediating events are generally available within a database 128. In accordance with the various embodiments, the database 128 may include scripts that have been provided by a community of users and system administrators of various virtual infrastructures. Thus, a user of a first virtual infrastructure may create or obtain a script for use to remediate one or more virtual machines 116 and/or virtual objects 120 within the first virtual infrastructure in response to a first event. The user of the first infrastructure may then provide the script to the community of users of virtual infrastructures. The script may be stored within the database 128 of a virtual infrastructure. The community of users may have a separate database that contains only scripts provided by the community of users and which may be accessed by the community of users. A user of a second virtual infrastructure may then have an alert generated in response to the first event that occurred within the first virtual infrastructure, but which has now occurred within the second virtual infrastructure. The user of the second virtual infrastructure may then obtain the script provided by the user of the first virtual infrastructure from the database of the community of users. The user of the second virtual infrastructure may then use the script to remediate affected virtual machines 116 and/or virtual objects 120 within the second virtual infrastructure. The user of the second virtual infrastructure may store the script within the database 128 of the second virtual infrastructure if desired.

In accordance with various embodiments, the component 124 may be configured to automatically execute a script in response to an alert in order to remediate the event that caused the alert with respect to any affected virtual machines 116 and/or virtual objects 120. In response to the alert, the component 124 will select a script for execution against any affected virtual machines 116 and/or virtual objects 120 and will represent the affected virtual machines 116 and/or virtual objects 120 in the scripting format. The component 124 will also marshal any affected virtual machines 116 and/or virtual objects 120, if there are multiple affected virtual machines 116 and/or virtual objects 120. The component 124 will then execute the script against the affected virtual machines 116 and/or virtual objects 120 in order to remediate the event that caused the alert.

In accordance with various embodiments, the component 124 may be configured such that alerts arising from various occurrences or situations within the infrastructure are correlated with a first virtual machine or object. The first virtual machine or object may then be linked with a second virtual machine or object to thereby indicate to a system administrator of the possible effects that the condition causing the alert with respect to the first virtual machine or object may have on the second virtual machine or object, even though the alert was generated for the first virtual machine or object. One or more scripts may be executed to remediate the event that caused the alert with respect to the first virtual machine or object and the second virtual machine or object.

Figure 3:
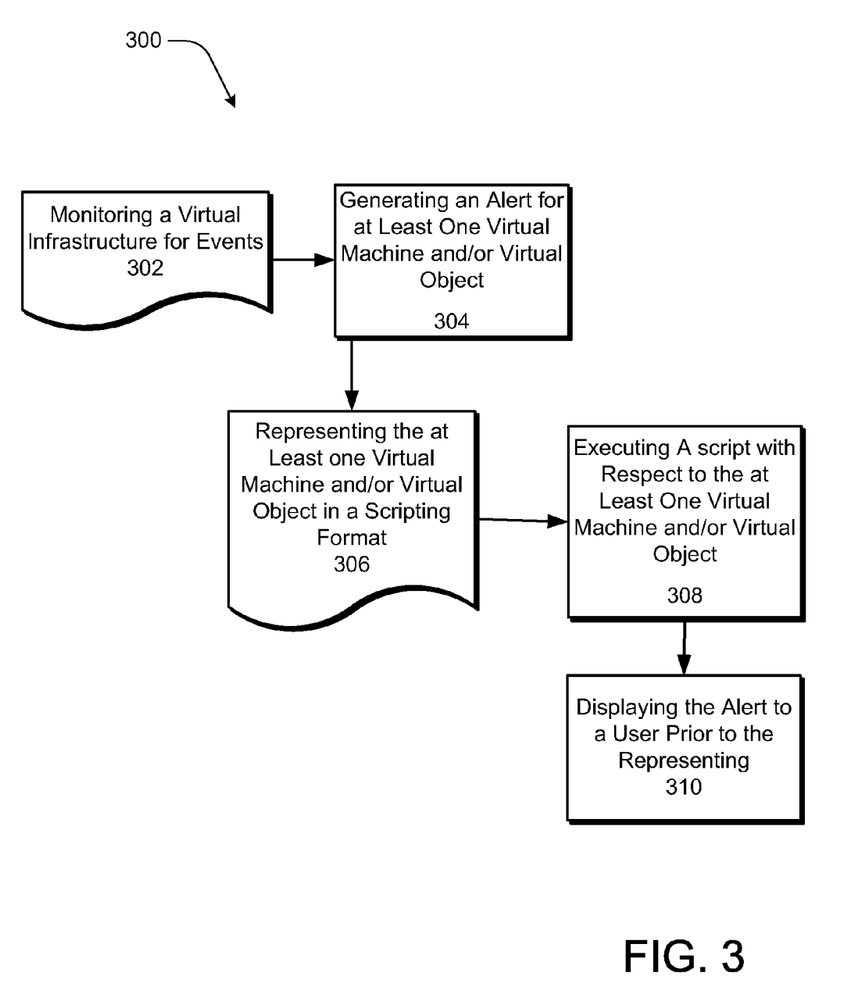
FIG. 3 is a flowchart illustrating some aspects of methods in accordance with the present disclosure.

Accordingly, with reference to FIG. 3, a method 300 in accordance with the present disclosure includes, at 302, monitoring a virtual infrastructure comprising a plurality of virtual machines and virtual objects and at 304, generating an alert for at least one virtual machine and/or virtual object due to an event within the virtual infrastructure. The method 300 also includes, at 306, representing at least one virtual machine and/or virtual object in a scripting format. The method 300 further includes, at 308, executing a script with respect to the at least one virtual machine and/or virtual object. The method 300 may also include, at 310, displaying the alert to a user prior to representing the at least one virtual machine and/or virtual object in a scripting format. In accordance with various embodiments, the script may be executed manually by the user. In accordance with other embodiments, the script is executed automatically.

Figure 4:
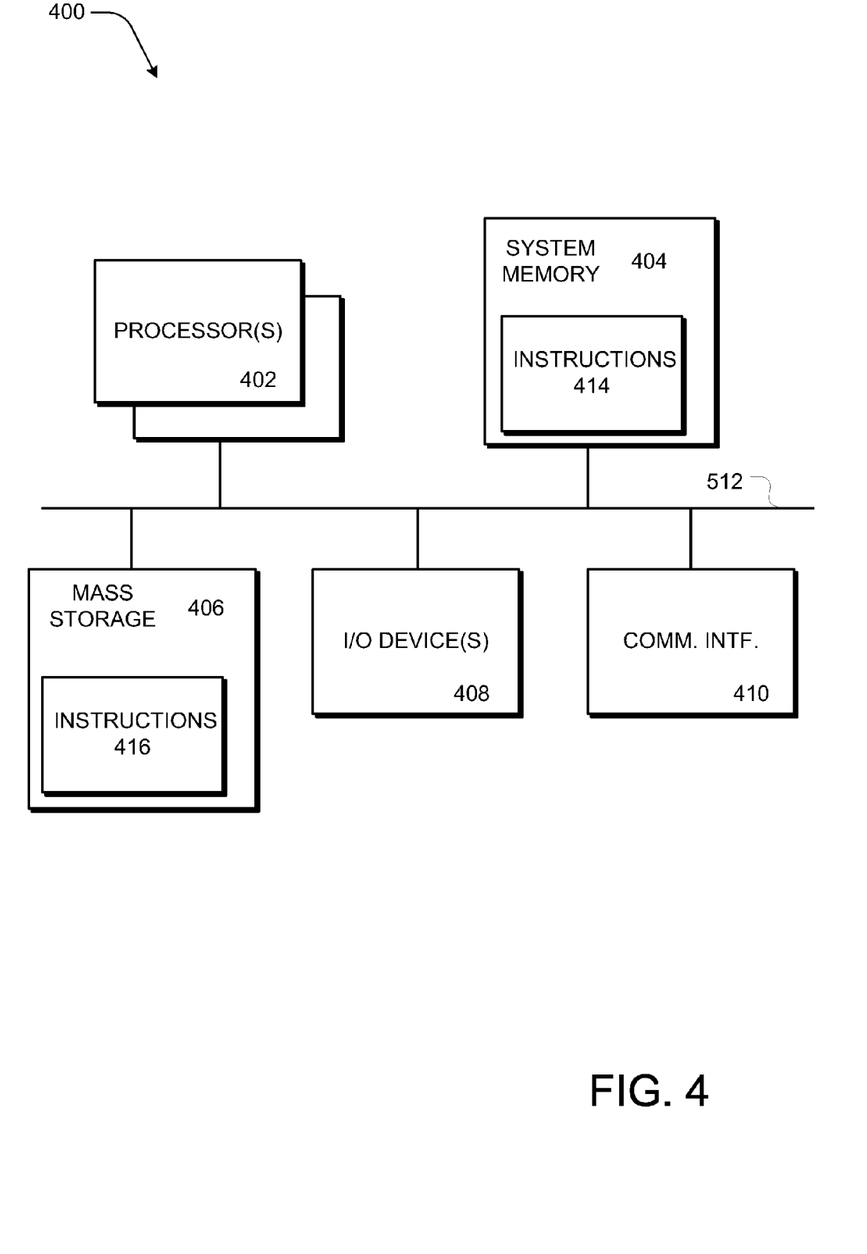
FIG. 4 schematically illustrates an example computer system suitable for use in association with a virtual infrastructure.

FIG. 4 illustrates an example computer system suitable for use in association with a virtual infrastructure, in accordance with various embodiments of this disclosure. As shown, computer system 400 may include one or more processors 402 and may include system memory 404. Additionally, computer system 400 may include mass storage 406 in the form of one or more devices (such as diskette, hard drive, compact disk (CD), flash memory, and so forth), input/output devices 408 (such as keyboard, cursor control and so forth) and communication interfaces 410 (such as network interface cards, modems and so forth). The elements may be coupled to each other via system bus 412, which may represent one or more buses. In the case where system bus 412 represents multiple buses, the multiple buses may be bridged by one or more bus bridges (not shown).

These elements each perform their conventional functions known in the art. In various embodiments, communication interfaces 410 may facilitate coupling of computing system 400 to a network, though which computing system 400 may be coupled to one or more data processing devices of a data processing environment and so forth, as necessary. In various embodiments, computing system 400 may at least be partially incorporated in such a data processing device. System memory 404 and mass storage 406 may be employed to store a working copy and a permanent copy of the programming instructions, illustrated as Instructions 414 and 416, respectively, for implementing various aspects of the one or more earlier described embodiments of the present disclosure. The permanent copy of the programming instructions may be loaded into mass storage 406 in the factory or in the field, through a distribution medium (not shown), or through communication interface 410 from, for example, a distribution server (not shown). The constitution of these elements 402-412 are known, and accordingly will not be further described. In alternate embodiments, part or all of the one or more modules may be implemented in hardware, for example, using one or more Application Specific Integrated Circuits (ASICs) instead.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium, wherein the plurality of instructions are adapted to cause one or more processors within a computing environment to perform a plurality of operations comprising monitoring a virtual infrastructure comprising a plurality of virtual machines and virtual objects, generating an alert for at least one virtual machine and/or object due to an event within the virtual infrastructure, representing the at least one virtual machine and/or object in a scripting format, and executing a script with respect to the at least one virtual machine and/or object. In various embodiments, an article of manufacture may comprise a storage medium and a plurality of programming instructions stored in the storage medium and adapted to program, for example, computing system 400 to configure the computing system 400 to perform one or more operations of the method 300.

While the present invention has been described with respect to VMware®, the present invention is equally applicable to other types of virtualization systems and software and the present invention is not limited in this regard.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
monitoring a virtual infrastructure comprising a plurality of virtual machines and virtual objects for an event affecting at least one of the virtual machines and/or virtual objects within the virtual infrastructure;
detecting an occurrence of the event;
converting the at least one affected virtual machine and/or virtual object from its internal representation within the virtual infrastructure into a scripting representation using a scripting format;
selecting a script compatible with the scripting format; and
executing the script against the at least one affected virtual machine and/or virtual object represented in the scripting format.

2. The method of claim 1, further comprising generating an alert for the at least one affected virtual machine and/or virtual object responsive to the detection of the event within the virtual infrastructure prior to representing the at least one affected virtual machine and/or virtual object in the scripting format.

3. The method of claim 2, wherein the alert is generated for multiple virtual machines and/or virtual objects.

4. The method of claim 1, wherein the script is executed manually by a user via a user interface.

5. The method of claim 1, wherein the script is downloaded from a database.

6. The method of claim 1, wherein the script is executed automatically.

7. A system comprising:
a virtual infrastructure implemented on one or more physical hosts, the virtual infrastructure comprising:
a virtual control center;
at least one virtual machine;
at least one virtual object; and
a component configured to:
monitor the virtual infrastructure for an event affecting at least one of the at least one virtual machine and/or virtual object within the virtual infrastructure;
detect an occurrence of the event;
convert the at least one affected virtual machine and/or virtual object from its internal representation within the virtual infrastructure into a scripting representation having a scripting format;
select a script compatible with the scripting format; and
execute the script against the at least one affected virtual machine and/or virtual object represented in the scripting format.

8. The system of claim 7, wherein the component is further configured to generate an alert for the at least one affected virtual machine and/or virtual object responsive to the detection of the event within the virtual infrastructure prior to representing the at least one affected virtual machine and/or object in the scripting format.

9. The system of claim 8, wherein the alert is generated for multiple virtual machines and/or virtual objects.

10. The system of claim 7, wherein the script is executed manually by a user via a user interface.

11. The system of claim 7, wherein the script is downloaded from a database.

12. The system of claim 7, wherein the script is executed automatically.

13. An article of manufacture comprising:
a non-transitory storage medium; and
a plurality of instructions stored thereon, wherein the plurality of instructions are adapted to cause one or more processors within a computing environment to perform a plurality of operations comprising:
monitoring a virtual infrastructure comprising a plurality of virtual machines and virtual objects for an event affecting at least one of the virtual machines and/or virtual objects within the virtual infrastructure;

detecting an occurrence of the event;

converting the at least one affected virtual machine and/or virtual object from its internal representation within the virtual infrastructure into a scripting representation compatible with scripting format;

selecting a script compatible with the scripting format; and executing the script against the at least one affected virtual machine and/or virtual object represented in the scripting format.

14. The article of manufacture of claim 13, wherein the plurality of operations further comprise generating an alert for the at least one affected virtual machine and/or virtual object responsive to the detection of the event within the virtual infrastructure prior to representing the at least one affected virtual machine and/or virtual object in the scripting format.

15. The article of manufacture of claim 14, wherein the alert is generated for multiple virtual machines and/or virtual objects.

16. The article of manufacture of claim 13, wherein the script is executed manually by a user via a user interface.

17. The article of manufacture of claim 13, wherein the script is downloaded from a database.

18. The article of manufacture of claim 13, wherein the script is executed automatically.

19. The article of manufacture of claim 18, wherein the alert is generated for multiple virtual machines and/or virtual objects.

\* \* \* \* \*